W. M. SPACHT.
Railway-Rail Joints.

No. 164,051.

2 Sheets--Sheet 1.

Patented June 1, 1875.

Witnesses:

Inventor
William M. Spacht
By James L. Norris
Atty

W. M. SPACHT.
Railway-Rail Joints.

No. 164,051.

2 Sheets--Sheet 2.

Patented June 1, 1875.

UNITED STATES PATENT OFFICE.

WILLIAM M. SPACHT, OF DUNKIRK, OHIO.

IMPROVEMENT IN RAILWAY-RAIL JOINTS.

Specification forming part of Letters Patent No. 164,051, dated June 1, 1875; application filed April 21, 1875.

*To all whom it may concern:*

Be it known that I, WILLIAM M. SPACHT, of Dunkirk, in the county of Hardin and State of Ohio, have invented certain new and useful Improvements in Railroad-Rail Joints, of which the following is a specification:

This invention has for its object to furnish a perfect and simple mode of securing the ends of railroad-rails, whereby the use of screw-threaded bolts and nuts is avoided, thus removing a source of great danger and annoyance which arises from the loosening of nuts in railroad-joints.

The invention consists in the employment of reversely-arranged wedge-shaped plates or blocks, which are interposed between one of the heads of the bolts and fish-plates, for the purpose of tightening and securing the bolts, the latter being for this purpose passed through slots in the wedges, the latter being forced in opposite directions, in order to tighten and secure the bolts, all of which will be fully hereinafter described.

Figure 1:
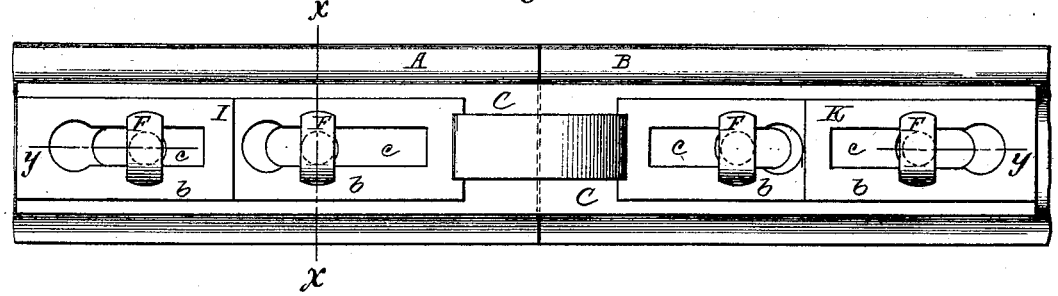
Figure 2:
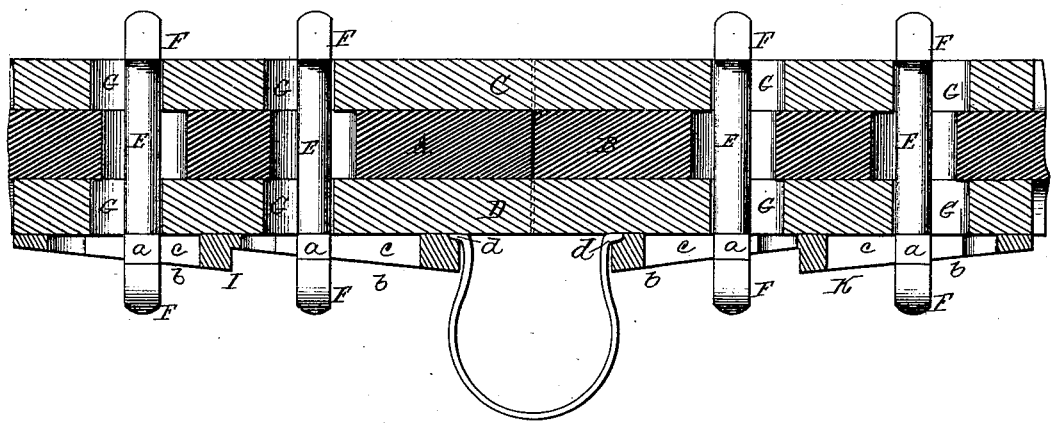
Figure 3:
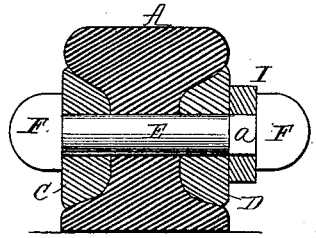
Figure 4:
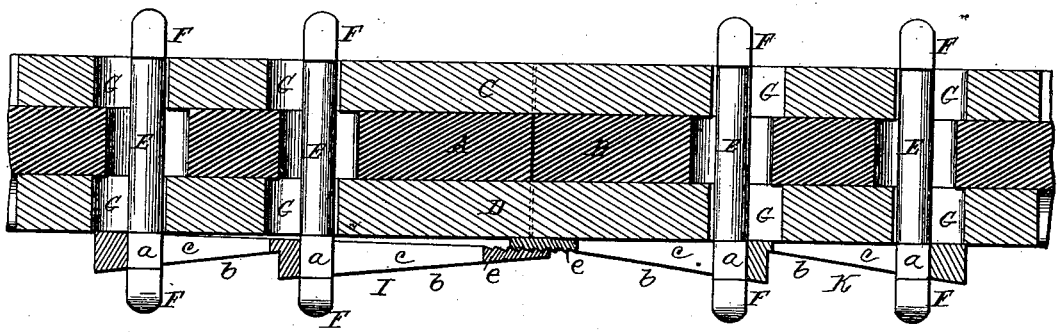

In the accompanying drawings, Figure 1 is a side elevation of a railroad-joint, showing the headed bolts and fastening-wedges. Fig. 2 is a horizontal longitudinal section taken through the lines $y\ y$ of Fig. 1. Fig. 3 is a vertical transverse section taken in the line $x\ x$, and Fig. 4 is a longitudinal section of a modification of my invention.

A and B designate the contiguous rail-sections, on opposite sides of which are located fish or splice plates C D, in the usual manner. In lieu of screw-threaded bolts and nuts, heretofore used for securing the fish-plates, I employ bolts E, having plain or smooth bodies, and provided with a head, F, at each end, said heads being constructed of an elliptical, rounded, or other suitable shape, and provided with inner square or beveled shoulders $a$. The bolts thus made are used in connection with the fish-plates C D, which are constructed with elongated slots or openings G, of sufficient width to permit the passage of the bolt-heads when the same are presented to the slots, but not wide enough to permit the withdrawal of the bolts after the same have been turned to cause their enlarged heads to lie across the slots in the fish-plates. The rails are also provided with elongated openings, for the passage of the bolts, by which means said rails can move longitudinally, to permit of their free contraction and expansion. In order to tighten and firmly secure the aforesaid bolts in position, I provide wedge-shaped blocks or plates I K, which are interposed between the fish-plate and one head of the bolts. The said wedges are each constructed with one, two, or more inclined outer surfaces, $b$, according to the number of bolts employed, and each incline is provided with an elongated slot, $c$, through which the bolt is passed. A pair of these wedge-shaped plates are used in connection with each rail-section, and they are reversely arranged, their larger ends being toward each other, and said larger ends being each constructed with a recess, $d$, on its inner edge, for the reception of the ends of a U-shaped metallic spring, in such manner that the arms of said spring will continually exert a pressure on the ends of the wedges, and serve to force them apart, or prevent them approaching each other, whereby the bolts are always secured in a tight and firm position.

In lieu of arranging the wedge-plates as above mentioned, I propose to have their smaller ends arranged toward and overlapping each other, both of said ends being furnished with a series of notches, $e\ e$, (see Fig. 4,) which will engage with each other, and lock the two wedge-plates together. By driving the said plates toward each other, the bolts may be tightened to the requisite degree; and, by reason of the ends of the wedges interlocking with each other, they are prevented from becoming loose, while they can be tightened up from time to time, as occasion requires.

It will be observed that the slots in the rails and fish-plates are so spaced that, when the bolts are at the ends of the slots in the fish-plates, they will be at or about the center of the slots in the rails, whereby the rails are permitted to have a free movement in either direction, to permit of their expansion and contraction; and it will also be seen that the bolts, at their junction with their heads, are squared or flattened, and one end of the slots in the wedges is enlarged, so that the bolt is free to turn in said enlarged portion of the slot, in order to cause the heads of the bolt to cross the slots; but when the wedges are driven in, the slots will grasp the square or flattened ends of the bolt, and effectually prevent them from turning.

In lieu of a spring to retain or force the wedges apart, I may employ a right-and-left-hand screw, and thereby accomplish the same purpose.

Having thus described my invention, what I claim as new, and desire to secure by Letters Patent, is—

The reversely-arranged wedges I K, having the slots c, in combination with the double-headed bolts E and the rails, substantially as described.

In testimony that I claim the foregoing I have hereunto set my hand.

WILLIAM M. SPACHT.

Witnesses:
D. W. EDGAR,
HUGH DOWNING.